United States Patent
Sadakane et al.

(10) Patent No.: US 7,082,926 B2
(45) Date of Patent: Aug. 1, 2006

(54) APPARATUS AND METHOD FOR CONTROLLING FUEL INJECTION IN INTERNAL COMBUSTION ENGINE

(75) Inventors: Shinji Sadakane, Toyota (JP); Koichi Yonezawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/109,826

(22) Filed: Apr. 20, 2005

(65) Prior Publication Data

US 2005/0235959 A1 Oct. 27, 2005

(30) Foreign Application Priority Data

Apr. 23, 2004 (JP) .............................. 2004-128607

(51) Int. Cl.
*F02B 7/00* (2006.01)
*F02B 7/02* (2006.01)

(52) U.S. Cl. ...................................... 123/431; 123/299

(58) Field of Classification Search ................ 123/431, 123/432, 299, 300, 304, 305, 436, 179.7, 123/179.16

See application file for complete search history.

(56) References Cited

U.S. PATENT DOCUMENTS

| 5,251,582 A | * | 10/1993 | Mochizuki | ................ | 123/73 A |
| 5,269,243 A | * | 12/1993 | Mochizuki | ............... | 123/41.55 |
| 5,832,880 A | * | 11/1998 | Dickey | ..................... | 123/25 C |
| 6,557,521 B1 | * | 5/2003 | Ichihara et al. | ............. | 123/299 |
| 2003/0041838 A1 | * | 3/2003 | Tsuchiya | ..................... | 123/299 |
| 2005/0166896 A1 | * | 8/2005 | Sadakane et al. | ........... | 123/431 |

FOREIGN PATENT DOCUMENTS

| JP | B2 2557640 | | 9/1996 |
| JP | A 2000-008916 | | 1/2000 |
| JP | 200352335 A | * | 12/2000 |
| JP | A 2001-020837 | | 1/2001 |
| JP | A 2001-073854 | | 3/2001 |

* cited by examiner

*Primary Examiner*—Mahmoud Gimie
(74) *Attorney, Agent, or Firm*—Oliff & Berridge, PLC

(57) ABSTRACT

An internal combustion engine includes an in-cylinder injector for injecting fuel into a combustion chamber of the engine and an intake system injector for injecting fuel into an intake system connected to the combustion chamber. In a starting state of the engine, an electronic control unit (ECU) causes the in-cylinder injector to perform only the initial injection to the combustion chamber, and causes the intake system injector to perform fuel injections after the initial injection. As a result, favorable engine startability is ensured, and the emission of unburned components is suppressed in the engine starting state.

9 Claims, 6 Drawing Sheets

APPARATUS AND METHOD FOR CONTROLLING FUEL INJECTION IN INTERNAL COMBUSTION ENGINE

BACKGROUND OF THE INVENTION

The present invention relates to an apparatus and method for controlling fuel injection in an internal combustion engine that has an in-cylinder injector for injecting fuel into a combustion chamber and an intake system injector for injecting fuel into an intake system.

There is known an internal combustion engine provided with an in-cylinder injector for directly injecting fuel into a combustion chamber of an internal combustion engine and an intake system injector for injecting fuel into an intake system such as an intake port or a surge tank (Japanese Laid-Open Patent Publication No. 2001-73854).

In the internal combustion engine described in this Japanese Laid-Open Patent Publication No. 2001-73854, under the control of fuel injection in the engine starting state, fuel is first injected from an intake system injector for a predetermined time period. Then, fuel is injected from an in-cylinder injector. By executing such control of fuel injection, an initial explosion, that is, the first combustion of air-fuel mixture in the combustion chamber is performed by fuel injected into an intake system. Thus, since temperature within the combustion chamber rises after the initial explosion, vaporization of the fuel injected from the in-cylinder injector is promoted. Therefore, according to the control of fuel injection in the engine starting state described in the Japanese Laid-Open Patent Publication No. 2001-73854, it becomes possible to restrain the fuel injected from the in-cylinder injector in the engine starting state from being discharged as an unburned component.

When injecting fuel into the intake system, it takes some time period for the fuel injected to flow into the combustion chamber. For this reason, in the above-described conventional internal combustion engine, the initial combustion of the air-fuel mixture in the combustion chamber in the engine starting state, that is, an initial explosion becomes late, and there is a possibility that the engine startability becomes deteriorated.

In this case, when fuel is directly injected into the combustion chamber in the engine starting state, it is possible to shorten a time period required between the fuel injection and the initial explosion, and to ensure favorable engine startability. When, however, the temperature within the combustion chamber is as low as when the engine is started, the fuel directly injected within the combustion chamber easily adheres to the inner wall of the combustion chamber and the piston, and there is a possibility that this adhered fuel is discharged as an unburned component.

SUMMARY OF THE INVENTION

Accordingly, it is an objective of the present invention to provide an apparatus for controlling fuel injection in an internal combustion engine provided with an intake system injector and an in-cylinder injector, capable of ensuring favorable engine startability, and curbing a discharge of an unburned component in the engine starting state.

To achieve the foregoing and other objectives and in accordance with the purpose of the present invention, an apparatus for controlling fuel injection of an internal combustion engine in a starting state is provided. The engine includes an in-cylinder injector for injecting fuel into a combustion chamber of the engine and an intake system injector for injecting fuel into an intake system connected to the combustion chamber. The apparatus includes a control section that controls the in-cylinder injector and the intake system injector. In the starting state of the engine, the control section causes the in-cylinder injector to first inject fuel, and then switches from the fuel injection through the in-cylinder injector to fuel injection through the intake system injector.

The present invention provides another apparatus for controlling fuel injection of an internal combustion engine in a starting state. The engine includes an in-cylinder injector for injecting fuel into a combustion chamber of the engine and an intake system injector for injecting fuel into an intake system connected to the combustion chamber. The apparatus includes a control section that controls the in-cylinder injector and the intake system injector. In the starting state of the engine, the control section causes the in-cylinder injector and the intake system injector to inject fuel. After timing at which fuel injected from the intake system injector reaches the combustion chamber, the control section causes the in-cylinder injector to stop injecting fuel.

The present invention also provides a method for controlling fuel injection of an internal combustion engine in a starting state. The engine including an in-cylinder injector for injecting fuel into a combustion chamber of the engine and an intake system injector for injecting fuel into an intake system connected to the combustion chamber. The method includes: causing the in-cylinder injector to first inject fuel in the starting state of the engine; and then switching from the fuel injection through the in-cylinder injector to fuel injection through the intake system cylinder.

The present invention provides another method for controlling fuel injection of an internal combustion engine in a starting state. The engine includes an in-cylinder injector for injecting fuel into a combustion chamber of the engine and an intake system injector for injecting fuel into an intake system connected to the combustion chamber. The method includes: causing the in-cylinder injector and the intake system injector to inject fuel in the starting state of the engine; and causing the in-cylinder injector to stop injecting fuel after timing at which fuel injected from the intake system injector reaches the combustion chamber.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A fuel injection controlling apparatus for an internal injection engine 11 according to a first embodiment of the present invention will now be described with reference to FIGS. 1 to 5.

Figure 1:
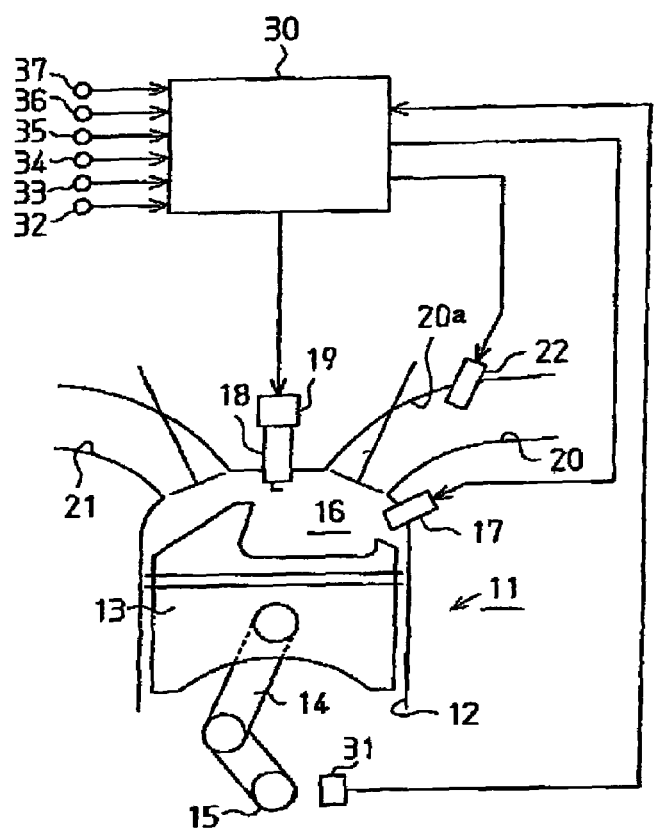
FIG. 1 is a diagram illustrating a fuel injection controlling apparatus for an internal combustion engine according to a first embodiment of the present invention.

FIG. 1 illustrates the configuration of the internal combustion engine 11 to which the fuel injection controlling apparatus according to this embodiment is applied.

As shown in FIG. 1, this apparatus is configured with a four-cylinder, four-cycle internal combustion engine 11 as a core component. The internal combustion engine 11 has four cylinders 12, which are referred to as a first cylinder #1 to a fourth cylinder #4. In each of these cylinders 12 (only one of which is shown in FIG. 1), a piston 13 is provided. Each piston 13 is coupled to a crankshaft 15, which is an output shaft of the internal combustion engine 11, via a connecting rod 14 such that reciprocation of the piston 13 is converted into rotation of the crankshaft 15 through the connecting rod 14.

A combustion chamber 16 is defined in each cylinder 12 above the piston 13. An in-cylinder injector 17 is provided for each cylinder 12 to be exposed to the combustion chamber 16. To each in-cylinder injector 17, fuel at a predetermined high-pressure is supplied through a known fuel supply mechanism. When the in-cylinder injector 17 is actuated to open, fuel is directly injected into the combustion chamber 16.

The engine 11 includes ignition plugs 18, each provided in one of the cylinders 12. Each ignition plug 18 ignites the air-fuel mixture generated in the corresponding combustion chamber 16. The timing for igniting the air-fuel mixture by each ignition plugs 18 is adjusted by an igniter 19 provided above the ignition plug 18.

The combustion chambers 16 are connected to an intake passage 20 and an exhaust passage 21. Each portion that connects one of the combustion chambers 16 with the intake passage 20 forms an intake port 20a. Intake system injectors 22 are located in the intake passage 20 such that each intake system injector 22 corresponds to one of the cylinders 12. Each intake system injector 22 injects fuel into the intake passage 20 and toward the corresponding intake port 20a. To each intake system injector 22, fuel at a predetermined pressure is supplied via a known mechanism. Thus, as each intake system injector 22 is actuated to open, fuel is injected into the intake passage 20. Also, the intake passage 20 is provided with a throttle valve (not shown) for adjusting the flow rate of air drawn into the combustion chambers 16. The intake passage 20, the intake ports 20a form an intake system of the internal combustion engine 11.

Various control procedures of the internal combustion engine 11 are executed by an electronic control unit (ECU) 30. Although not illustrated, the ECU 30 is configured with a central processing unit (CPU) for executing various procedures related to engine control, memory for storing control programs and information necessary for engine control, drive circuits for the in-cylinder injectors 17 and the intake system injectors 22, and drive circuits for the igniters 19.

The ECU 30 is connected to various sensors that detect the running state of the engine 11. For example, the phase angle of the crankshaft 15, or the crank angle, is detected by a crank angle sensor 31. The engine speed NE is computed based on the detected crank angle. Also, a cylinder discriminating sensor 32 detects that the piston of a specific cylinder is located at the top dead center, and on the basis of output signals from the crank angle sensor 31 and the cylinder discriminating sensor 32, the crank angle indicating the position of the crankshaft 15 is determined. Also, an accelerator pedal depression degree ACCP is detected by an accelerator pedal sensor 33. Also, the ECU 30 receives detected signals from a pressure sensor 34 for detecting the pressure (intake passage pressure Pin) within the intake passage 20. On the basis of the detected signals from the pressure sensor 34, a flow rate Qa of intake air is computed. Further, the ECU 30 receives detected signals from sensors required for engine control such as a coolant temperature sensor 35 for detecting the temperature (coolant temperature THW) of the engine coolant, a temperature sensor 36 for detecting the temperature (intake air temperature THA) of intake air, and a fuel pressure sensor 37 for detecting fuel pressure (fuel pressure P) of the intake system injectors 22. Thus, the ECU 30 executes various engine control including the control of fuel injection and control of ignition timing in response to the operating condition of the internal combustion engine 11, which condition is obtained through those detected signals from various sensors.

Figure 2:
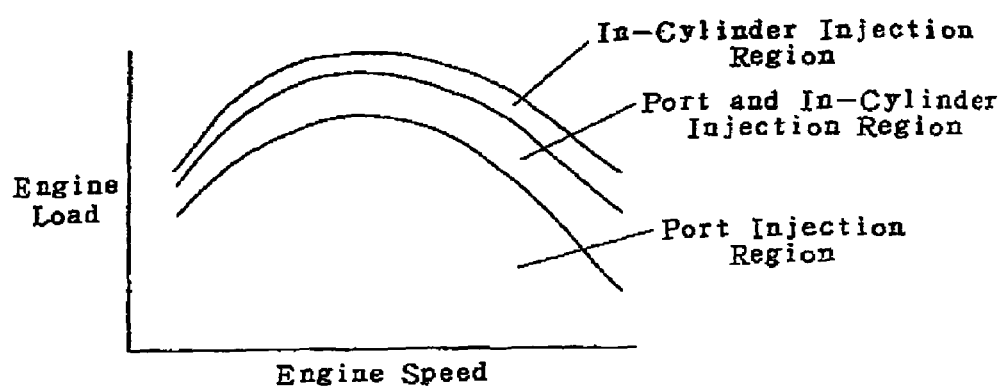
FIG. 2 is a graph showing the relationship between the operation state of the engine and a mode of fuel injection according to the first embodiment.

The fuel injection control executed in the engine 11 during a normal operation will now be described First, a mode of control of fuel injection according to the present embodiment is shown in FIG. 2. As shown in FIG. 2, in the present embodiment, on the basis of the engine speed NE of the internal combustion engine 11 and an engine load L, it is determined whether either one of or both of the intake system injectors 22 and the in-cylinder injectors 17 is used. The engine load L of the internal combustion engine 11 is defined by an amount of intake air per rotation of, for example, the internal combustion engine 11.

As shown in FIG. 2, in the present embodiment, in a region of a maximum load (maximum intake air amount) which is a load when the throttle valve is opened full or substantially full at each speed of the internal combustion engine 11, the in-cylinder injection, in which fuel is supplied into the combustion chambers 16 through the in-cylinder injectors 17, is executed. In the in-cylinder injection according to the present embodiment, fuel is injected from each in-cylinder injector 17 during the intake stroke of the corresponding. piston 13, and the combustion mode is basically homogenous combustion. Also, in a driving region of the internal combustion engine 11 from a low load to a medium load which are loads when the degree of opening of the throttle valve is changed from a fully closed state to a medium degree, port injection, in which fuel is supplied into the combustion chambers 16 through the intake system injectors 22, is executed. In a region between these regions, port and in-cylinder injection, in which fuel is supplied into the combustion chambers 16 through both the in-cylinder injectors 17 and the intake system injectors 22, is executed.

In the present embodiment as described above, the fuel injection mode is changed in response to the engine driving state, whereby ensuring uniformity of the air-fuel mixture and increases the output of the internal combustion engine 11 in the high-load region.

In other words, when the intake system injectors 22 are used, it is easier to promote the uniformity of the air-fuel mixture as compared with when the in-cylinder injectors 17 are used. For this reason, in a driving region from a low load to a medium load, the uniformity of the air-fuel mixture can be ensured through the use of the intake system injectors 22. On the other hand, when fuel is injected through the use of the in-cylinder injectors 17, it is easier to decrease the temperature of the air-fuel mixture in the combustion chambers 16 through vaporization latent heat of fuel as compared with when fuel is injected through the use of the intake system injectors 22. For this reason, in a high-load driving region, through the use of the in-cylinder injectors 17, a filling factor of intake air to the combustion chambers 16 is increased through the use of the in-cylinder injectors 17, and the engine output is increased.

Figure 3:
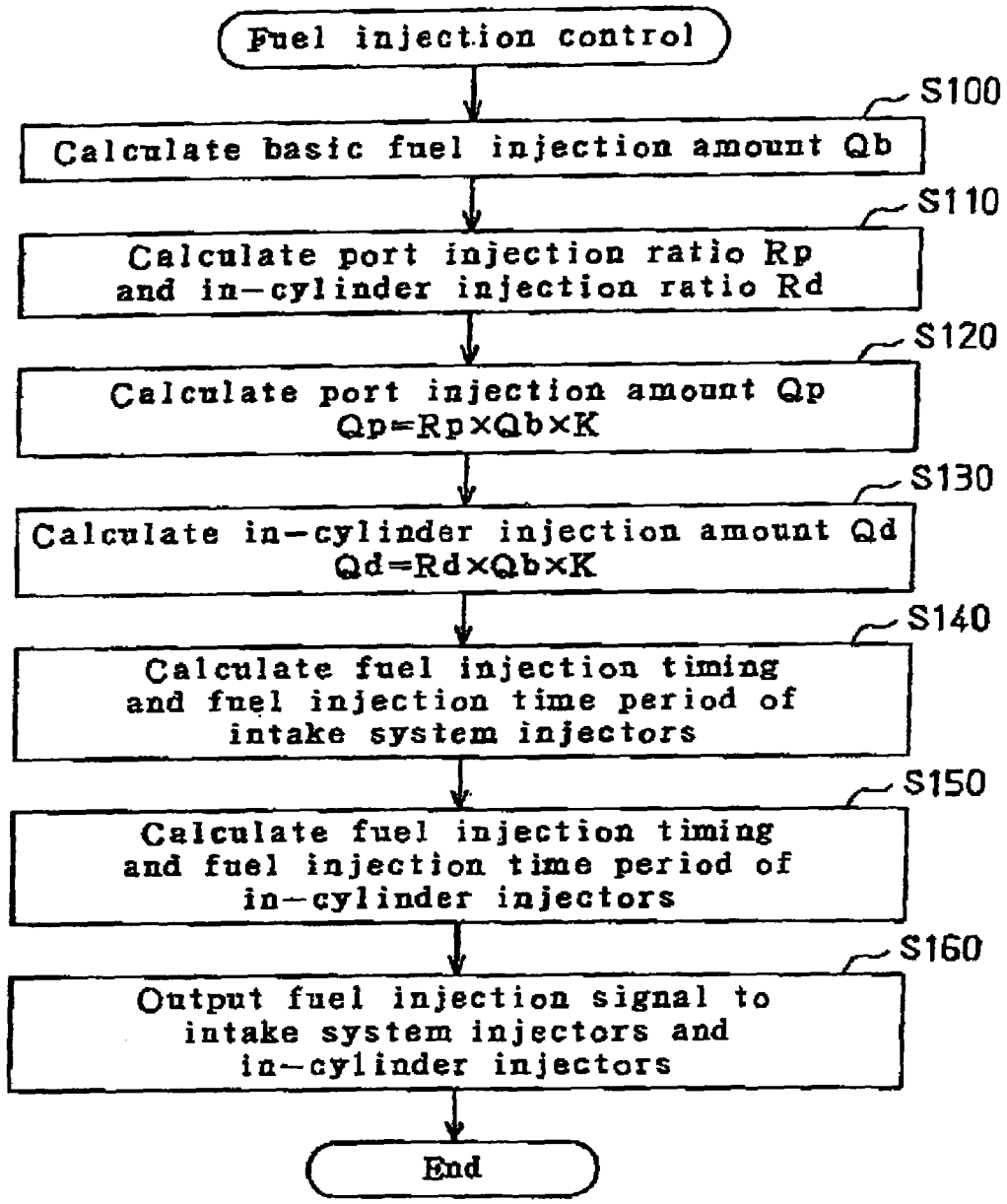
FIG. 3 is a flowchart showing a procedure for fuel injection control according to the first embodiment.

A procedure for the fuel injection control during normal operation of the engine 11 will now be described with reference to FIG. 3. The process shown in FIG. 3 is repeatedly executed by the ECU 30 at a predetermined interval.

First, at step S100, on the basis of the engine load L, which is computed from the accelerator pedal depression degree ACCP, the intake air flow rate Qa, and the engine speed NE, the basic fuel injection amount Qb is computed. The fuel injection amount is computed by referring to an injection amount calculation map stored in the memory of the ECU 30 in advance.

In step S110, a port injection ratio Rp, which is a ratio of fuel injection amount of each intake system injector 22 to the total amount of fuel supplied into the corresponding combustion chamber 16, and an in-cylinder injection ratio Rd, which is a ratio of fuel injection amount of each in-cylinder injector 17 to the total amount of fuel supplied into the corresponding combustion chamber 16, are set on the basis of the engine operating state. These injection ratios are Rp=1 and Rd=0 in the port injection region shown in FIG. 2, and Rp=0 and Rd=1 in the in-cylinder injection region. The ratios are varied within a range satisfying inequalities 0<Rp<1, 0<Rd<1, and an equation Rp+Rd=1 in the port and in-cylinder injection region.

In step S120, a fuel injection amount Qp for port injection by the intake system injectors 22, i.e., a port injection amount Qp, is computed from the following expression (1) on the basis of the port injection ratio Rp and the basic fuel injection amount Qb. A correction factor K is a correction term to be set on the basis of the coolant temperature, and the control of air-fuel ratio of the internal combustion engine 11.

$$Qp = Rp \times Qb \times K \quad (1)$$

In step S130, a fuel injection amount Qd for in-cylinder injection by the in-cylinder injectors 17, i.e., an in-cylinder injection amount Qd, is computed from the following expression (2) on the basis of the in-cylinder injection ratio Rd and the basic fuel injection amount Qb. The correction factor K is a correction term to be set on the basis of the coolant temperature and the control of air-fuel ratio of the internal combustion engine 11.

$$Qd = Rd \times Qb \times K \quad (2)$$

As shown in this expression (2), as the in-cylinder injection ratio Rd becomes higher, the in-cylinder injection amount Qd is increased.

In step 140, fuel injection timing of the intake system injectors 22 is computed based on the engine speed NE and the engine load L. The computed fuel injection timing is obtained by expressing timing at which fuel injection from the intake system injector 22 is started in each cylinder 12 in a crank angle with compression top dead center of the cylinder 12 as a reference. Also, on the basis of the computed port injection amount Qp and the engine speed NE, a fuel injection time period is computed, which is required for injecting fuel of an amount corresponding to the computed port injection amount Op from the intake system injector 22. The fuel injection timing and the fuel injection time period in this case are computed, as in the case of the basic fuel injection amount Qb, by referring to a calculation map for computing the injection timing and injection time period stored in the memory of the ECU 30 in advance.

In step 150, fuel injection timing of the in-cylinder injectors 17 is computed based on the engine speed NE and the engine load L. The computed fuel injection timing is also obtained by expressing timing at which fuel injection from the in-cylinder injector 17 is started in each cylinder 12 in a crank angle with compression top dead center of the cylinder 12 as a reference. Also, on the basis of the computed in-cylinder injection amount Qd and the engine speed NE, a fuel injection time period is computed, which is required for injecting fuel of an amount corresponding to the computed in-cylinder injection amount Qd from the in-cylinder injector 17. The fuel injection timing and the fuel injection time period in this case are computed, as in the case of the basic fuel injection amount Qb, by referring to a calculation map for computing the fuel injection timing and fuel injection time period stored in the memory of the ECU 30 in advance.

In step S160, on the basis of the fuel injection timing and fuel injection time period computed for each set of the injectors 17, 22, a fuel injection signal is generated for each cylinder 12, and is outputted to the intake system injector 22 and the in-cylinder injector 17 provided correspondingly to each cylinder 12, respectively. During a time period in which the fuel injection signal is outputted, fuel is injected from each of the intake system and in-cylinder injectors 22, 17. Thus, to the combustion chamber 16 of each cylinder 12, fuel of an appropriate amount is injected at appropriate timing responsive to the engine operating state.

Figure 4:
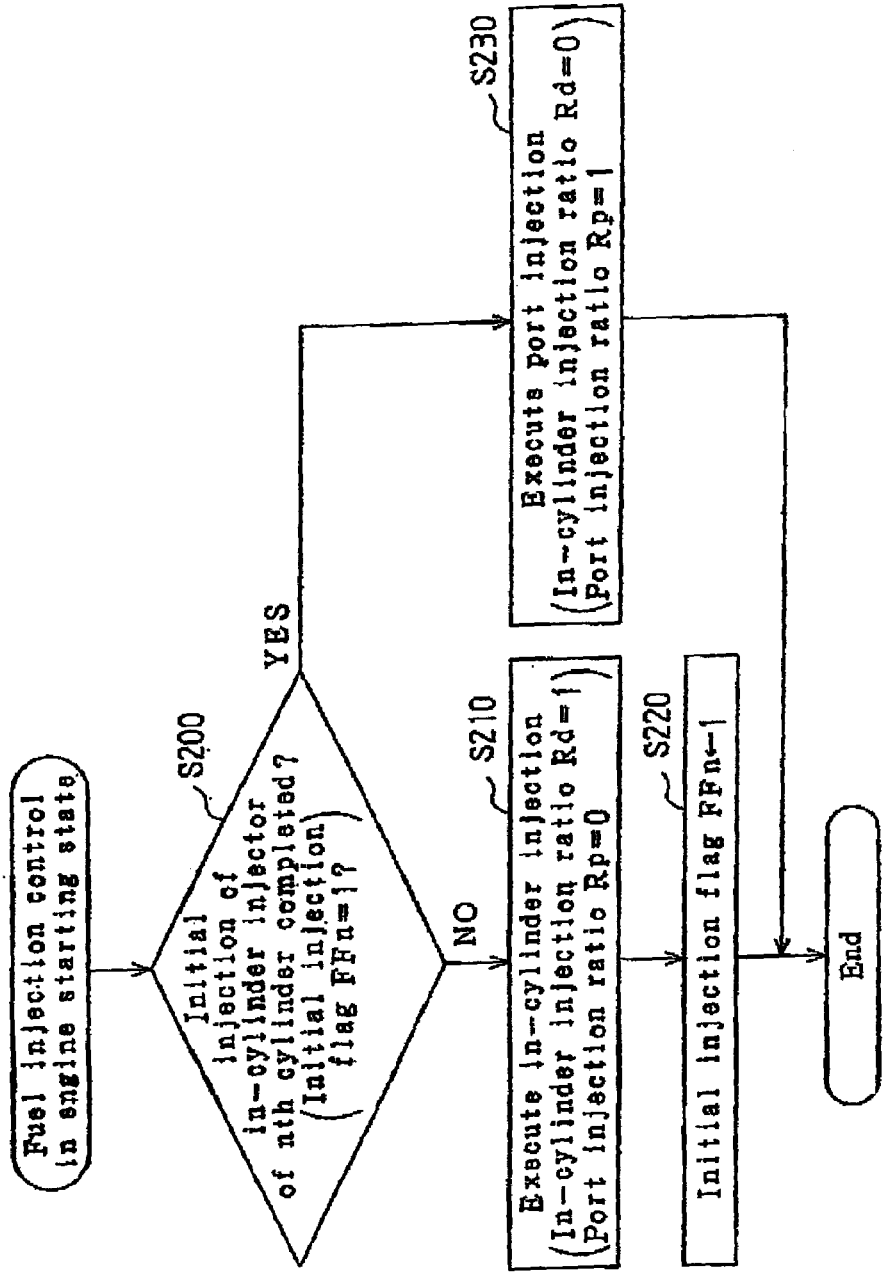
FIG. 4 is a flowchart showing a procedure for fuel injection control according to the first embodiment in the engine starting state.

Next, fuel injection control when starting (cranking) the engine 11 will now be described. FIG. 4 is a flowchart showing a procedure in this fuel injection control, and shows, of the in-cylinder injectors 17 and the intake system injectors 22 provided correspondingly to the first cylinder #1 to the fourth cylinder #4 respectively, the injection control of the in-cylinder injector 17 and the intake system injector 22 corresponding to the nth cylinder (n=1 to 4).

The ECU 30 repeatedly executes the process shown in this flowchart for each predetermined period on condition that the present engine operating state is an engine starting state (an engine cranking state), and that a present phase angle of the crankshaft 15, that is, the crank angle is determined. When executing this process, the ECU 30 functions as a control section.

When this process is started, it is first determined whether or not the first fuel injection in the engine starting state, that is, an initial injection has been completed concerning the in-cylinder injector 17 of the nth cylinder (S200). This determination is performed on the basis of whether or not an initial injection flag FFn is 1. The initial injection flag FFn is a flag to be set to 1 when the respective initial injection concerning the each in-cylinder injector 17 is completed, and its initial value is set to 0. When an initial injection from the individual in-cylinder injector 17 corresponding to, for example, the first cylinder #1 has been completed, FF1=1 is satisfied.

When it is determined that the initial injection concerning the in-cylinder injector 17 of the nth cylinder has not been completed (S200: NO), that is, in the case of the initial injection flag FFn=0, the fuel injection (in-cylinder injection) by the in-cylinder injector 17 of the nth cylinder is executed (S210). At this time, the in-cylinder injection ratio Rd is set to 1 and the port injection ratio Rp is set to 0. By referring to a map corresponding to the engine starting state, the basic fuel injection amount Qb, the fuel injection taming, and the fuel injection time period are set, and such a series of fuel injection control as shown in FIG. 3 is performed. In the present embodiment, the map is configured such that fuel injection of each in-cylinder injector 17 in the engine starting state is executed during an intake stroke of the corresponding cylinder. However, the map may be configured such that such injection is executed during, for example, a compression stroke.

The initial injection flag FFn is then set to 1 (S220), and the present process is temporarily suspended.

On the other hand, when it is determined in step S200 that the initial injection concerning the in-cylinder injector 17 of the nth cylinder has been completed (S200: YES), that is, in the case of the initial injection flag FFn=1, the fuel injection (port injection) by the intake system injector 22 of the nth cylinder is executed (S230). At this time, the in-cylinder injection ratio Rd is set to 0 and the port injection ratio Rp is set to 1. Then, by referring to a map corresponding to the engine starting state, the basic fuel injection amount Qb, the fuel injection timing, and the fuel injection time period are set, and such a series of fuel injection control as shown in FIG. 3 is performed. In the present embodiment, the map is configured such that fuel injection of each intake system injector 22 in the engine starting state is executed during an exhaust stroke of the corresponding cylinder. However, the map may be configured such that such injection is executed during, for example, an intake stroke.

As described above, the present process is executed, whereby in the fuel injection in the nth cylinder in the engine starting state, the fuel injection (in-cylinder injection) by the in-cylinder injector 17 is executed only for the initial injection, and in the fuel injections after the initial injection, it will be changed over to the fuel injection (port injection) by the intake system injector 22.

The present process is repeatedly executed, whereby in the fuel injection in each cylinder in the engine starting state, the fuel injection (in-cylinder injection) by the in-cylinder injector 17 is executed only in the initial fuel injection, and in the fuel injections after the initial injection, it will be changed over to the fuel injection (port injection) by the intake system injector 22.

Figure 5:
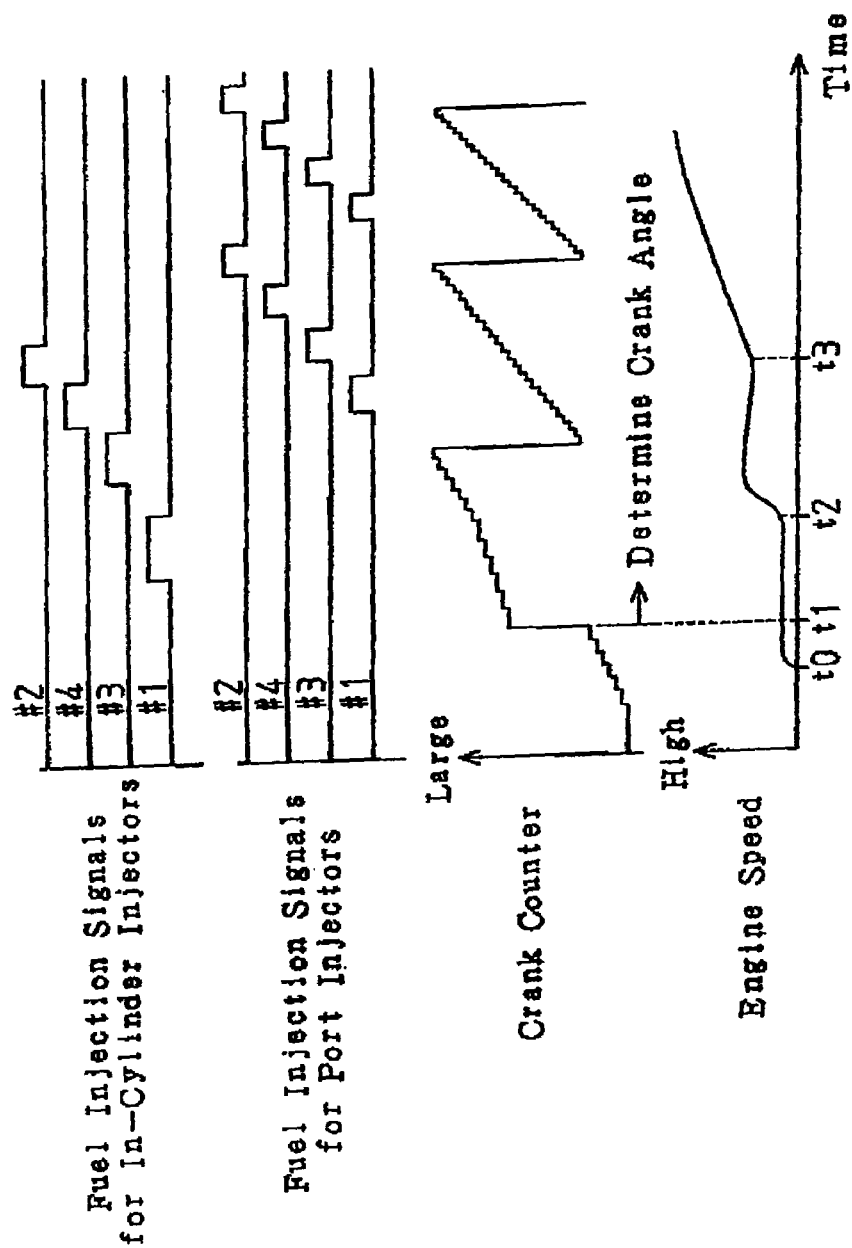
FIG. 5 is a timing chart showing an example of a procedure for fuel injection control according to the first embodiment in the engine starting state.

An example of the fuel injection control in the engine starting state will now be described with reference to the timing chart of FIG. 5. A crank counter shown in FIG. 5 shows a value indicating the above-described crank angle, which is counted up with rotation of the crankshaft 15. Also, when the crank angle is determined, the crank counter is set to a value corresponding to the crank angle thus determined. Thus, when the crankshaft 15 makes two revolutions, the value of the crank counter is reset to 0.

When the engine is first started (cranked) (time t0) and the crank angle is determined (time t1), as the initial fuel injection in each of the first cylinder #1 to the fourth cylinder #4, the fuel injection by the in-cylinder injector 17 provided correspondingly to each cylinder is executed. The fuel injections after the initial injection are executed by the intake system injector 22 provided correspondingly to each cylinder. In, for example, the first cylinder #1, only in the initial fuel injection in the engine starting state, fuel is injected from the in-cylinder injector 17 corresponding to the first cylinder #1, while the fuel injections after the initial injection are executed by the intake system injector 22 corresponding to the first cylinder #1. Thus, such fuel injections in units of cylinder are executed concerning the second cylinder #2 to the fourth cylinder #4, respectively.

According to the fuel injection control in the engine starting state as described above, the fuel injection by each in-cylinder injector 17 is first executed when starting the engine, whereby the initial explosion occurs promptly after the fuel injection (time t2). Thereafter, it is changed over to the fuel injection by the intake system injector 22, and when the fuel injected into each intake port 20a reaches the combustion chamber 16, consecutive combustion of the air-fuel mixture after the initial explosion, that is, complete explosion occurs with the previous initial explosion as a trigger (time on and after t3). Therefore, when starting the engine, it is possible to cause the initial explosion promptly and to link this to the complete explosion, and favorable engine startability is to be ensured.

Also, since after the fuel injection by the in-cylinder injector 17 is executed, the mode of fuel injection is changed over to the fuel injection by the intake system injector 22, when starting the engine, occurrence of a malfunction in which the fuel directly injected into each combustion chamber 16 by the corresponding in-cylinder injector 17 adheres to the inner wall of the combustion chamber 16 or the piston 13 is restrained as much as possible. Also, even when the fuel directly injected into each combustion chamber 16 adheres to the inner wall of the combustion chamber 16 or the piston 13, the adhered fuel is vaporized by such complete explosion as described above, and is burned together with the fuel injected into the intake port 20a. Since adhesion of fuel to the inner wall of the combustion chamber 16 or the piston 13 is restrained as much as possible as described above, the discharge of an unburned component in the engine starting state is also restrained.

Particularly, in the above-described embodiment, when starting the engine, fuel is directly injected into the combustion chamber 16 only in the initial fuel injection in each cylinder. The fuel injection from the in-cylinder injector 17 in the engine starting state as described above is restrained as much as possible, whereby the discharge of unburned component is restrained. Also, since a number of times of fuel injection by the in-cylinder injector 17 has been set in advance as described above, it is possible to easily grasp timing for changing over from the fuel injection by the in-cylinder injector 17 to the fuel injection by the intake system injector 22. This permits the mode of injection to be easily switched.

The present embodiment has the following advantages.

(1) When starting the engine, the fuel injection by the in-cylinder injectors 17 is executed, and thereafter, it is changed over to the fuel injection by the intake system injectors 22. For this reason, when starting the engine, the initial explosion is to occur promptly. Thereafter, it is changed over to the fuel injection by the intake system injector 22, whereby consecutive combustion of the air-fuel mixture after the initial explosion, that is, complete explosion occurs with the previous initial explosion as a trigger. According to the above-described embodiment, it is possible to cause the initial explosion-promptly when starting the engine for linking this to the complete explosion, and it becomes possible to ensure favorable engine startability.

(2) After the fuel injection by the in-cylinder injector 17 is executed, the mode of fuel injection is changed over to the fuel injection by the intake system injector 22. For this reason, when starting the engine, adhesion of fuel to the inner wall of each combustion chamber 16 or each piston 13 can be restrained as much as possible. Therefore, while ensuring the favorable engine startability, it becomes possible to favorably restrain the discharge of unburned component when starting the engine.

(3) When starting the engine, as the initial fuel injection in each cylinder, the fuel injection by the in-cylinder injectors 17 is executed, and the fuel injections after this initial one are changed over to the fuel injection by the intake system injectors 22. Therefore, it becomes possible to restrain the fuel injection from the in-cylinder injector 17 when starting the engine as much as possible, and to restrain the discharge of unburned component. Also, since a number of times of fuel injection by the in-cylinder injectors 17 has been set in advance as described above, it becomes possible to easily change over from the fuel injection by the in-cylinder injectors 17 to the fuel injection by the intake system injectors 22.

A second embodiment of the present invention will now be described. The differences from the first embodiment will mainly be discussed below.

In the first embodiment, when starting the engine, fuel is caused to be injected from the in-cylinder injectors 17 only in the initial injection, and after this initial injection, it is changed over to the fuel injection by the intake system injectors 22.

On the other hand, in the present embodiment, when starting the engine, both the fuel injection by the in-cylinder injectors 17 and the fuel injection by the intake system injectors 22 are first executed. After timing at which the fuel injected from each intake system injector 22 reaches the corresponding combustion chamber 16, the fuel injection by the in-cylinder injectors 17 is stopped. Therefore, the present embodiment is different from the first embodiment in the fuel injection control when starting the engine.

Figure 6:
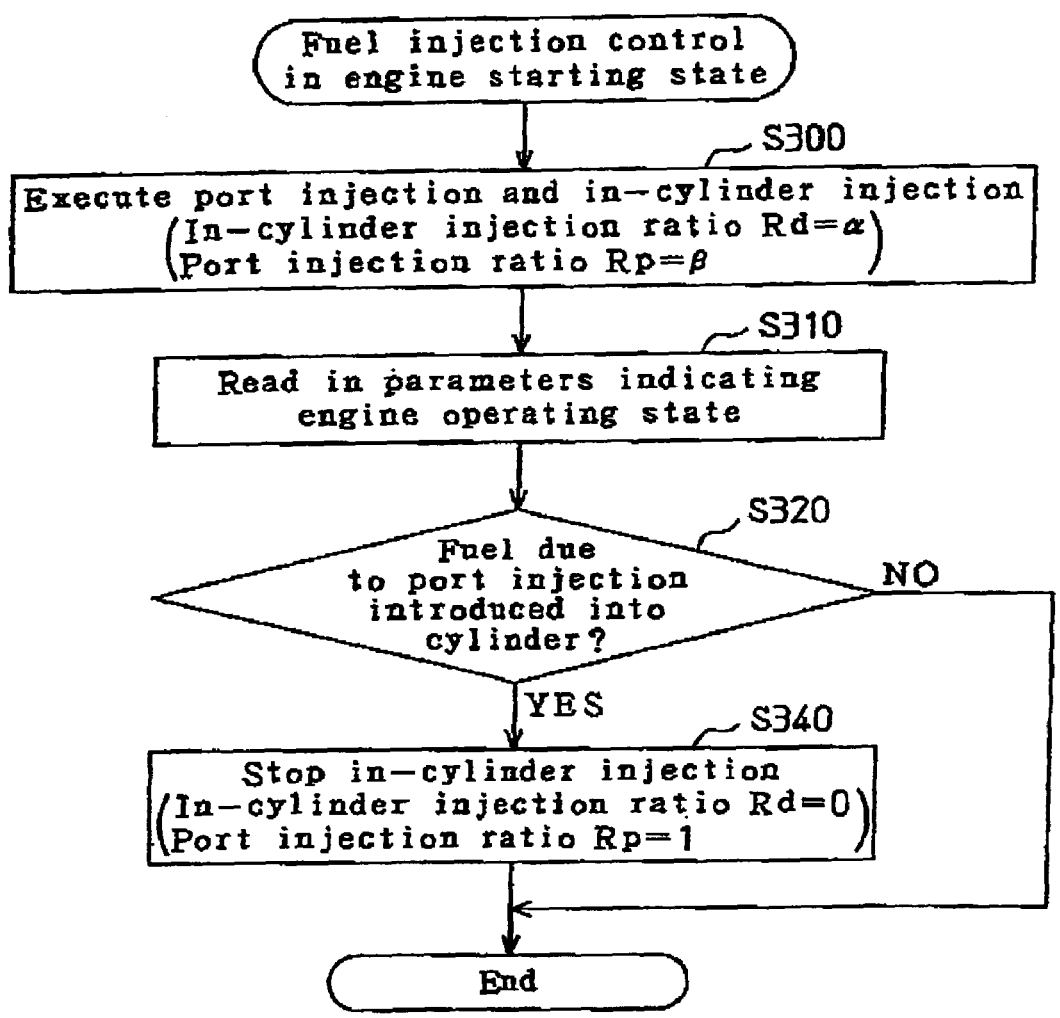
FIG. 6 is a flowchart showing a procedure for fuel injection control according to a second embodiment in the engine starting state.

FIG. 6 is a flowchart showing a procedure of the fuel injection control according to this embodiment.

The ECU 30 repeatedly executes the process shown in this flowchart for each predetermined period on condition that the present engine operating state is the engine starting state, and that the present phase angle of the crankshaft 15, that is, the crank angle has been determined.

When the present process is started, both the fuel injection (port injection) by the intake system injector 22 and the fuel injection (in-cylinder injection) by the in-cylinder injector 17 are first executed (S300). At this time, the in-cylinder injection ratio Rd is set to a starting in-cylinder injection ratio α (α>0) corresponding to the engine starting state, and the port injection ratio Rp is also set to a starting port injection ratio β (β>0) corresponding to the engine starting state. Then, by referring to a map corresponding to the engine starting state, the basic fuel injection amount Qb, the fuel injection timing and the fuel injection time period of the intake system injector 22 and the in-cylinder injector 17 are set, and such a series of fuel injection control as shown in FIG. 3 is performed. Even in the present embodiment, the fuel injection of each intake system injector 22 when starting the engine is performed during an exhaust stroke of the corresponding cylinder. Also, the fuel injection of each in-cylinder injector 17 when starting the engine is performed during an intake stroke of the corresponding cylinder.

Next, various parameters indicating the present engine operating state are read in (S310). The engine speed NE, the intake passage pressure Pin, the intake air temperature THA, the coolant temperature THW, and the fuel pressure P are read in, and on the bases of these parameters, it is determined whether or not fuel due to the port injection has been introduced into the cylinder, that is, whether or not the fuel injected from the intake system injector 22 has reached the corresponding combustion chamber 16 (S320).

Generally, timing at which the fuel injected from each intake system injector 22 reaches the corresponding combustion chamber 16 varies with flow velocity of the intake air and a vaporized state of the fuel. For example, as the engine speed NE becomes higher, or as intake passage pressure Pin becomes lower, the flow velocity of the intake air becomes faster, and the above-described timing is advanced. Also, since as the intake air temperature THA, the coolant temperature THW, or the fuel pressure P becomes higher, vaporization of the fuel is promoted, timing at which the air-fuel mixture at combustible concentration reaches the combustion chambers 16 is also advanced. Thus, in the present embodiment, by referring to the map on the basis of each of those parameters indicating the engine operating state, a crank angle corresponding to the timing is computed. Thus, it is determined whether or not the present actual crank angle detected by the crank angle sensor 31 has reached the computed crank angle, whereby it is determined whether or not the fuel injected from each intake system injector 22 has reached the corresponding combustion chamber 16.

When it is determined that the fuel due to the port injection has not yet been introduced into the cylinder (S320: NO), the present process is temporarily suspended. Thereafter, process from step S300 to step S320 is executed, and before the fuel due to the port injection is introduced into the cylinder, both the in-cylinder injection and the port injection are executed.

On the other hand, when it is determined that the fuel due to the port injection has been introduced into the cylinder (S320: YES), the in-cylinder injection is stopped after this determination (S340). At this time, the in-cylinder injection ratio Rd is set to 0, and the port injection ratio Rp is set to 1. Then, by referring to a map corresponding to the engine starting state, the basic fuel injection amount Qb, the fuel injection timing, and the fuel injection time period are set, and such a series of fuel injection control as shown in FIG. 3 is performed, whereby only the port injection is continued. Then, the present process is temporarily suspended.

Figure 7:
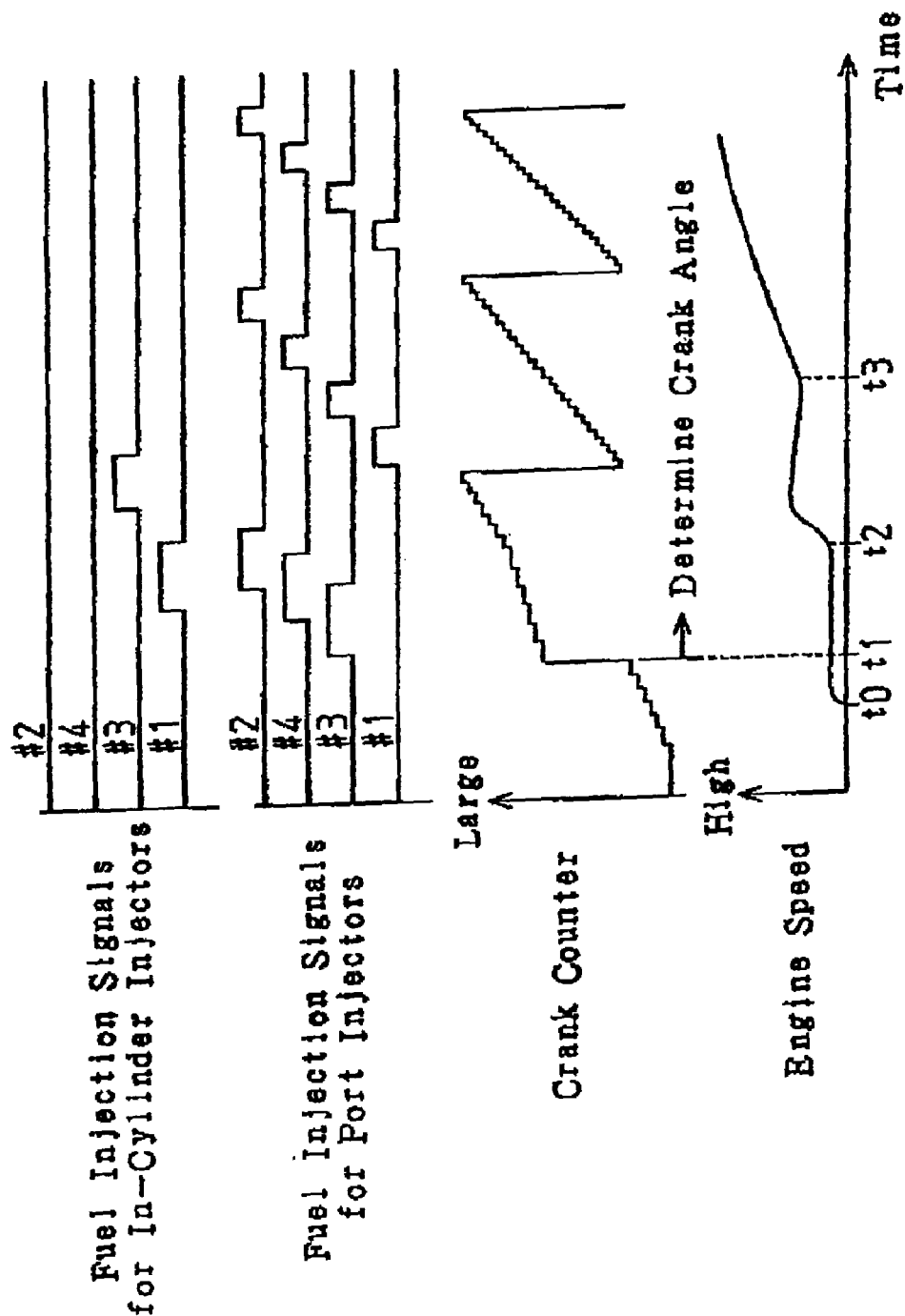
FIG. 7 is a timing chart showing an example of a procedure for fuel injection control according to the first embodiment in the engine starting state.

An example of the fuel injection control in the engine starting state will now be described with reference to the timing chart of FIG. 7.

When the engine is first started (cranked) (time t0) and the crank angle is determined (time t1), from the in-cylinder injector 17 and the intake system injector 22 provided correspondingly to each of the first cylinder #1 to the fourth cylinder #4, the fuel injection is executed in accordance with the fuel injection timing and fuel injection time period set as described above. Then, when the fuel injected from each intake system injector 22 reaches the corresponding combustion chamber 16, the fuel injection by the in-cylinder injector 17 is stopped. In this example of FIG. 7, the fuel first injected into one of the intake ports 20a after the crank angle is determined, that is, the fuel injected from the intake system injector 22 corresponding to the third cylinder #3 reaches the corresponding combustion chamber 16 after the in-cylinder injection is performed in the first cylinder #1 and the third cylinder #3. After this, the in-cylinder injections are stopped for all the cylinders. Thus, the in-cylinder injections in the fourth cylinder #4 and the second cylinder #2 are never executed.

According to the fuel injection control in the engine starting state executed in the above described manner, the fuel injection by the in-cylinder injectors 17 is executed when starting the engine, whereby the initial explosion first occurs promptly after the fuel injection (time t2). Thereafter, when the fuel injected into the intake ports 20a reaches the combustion chambers 16, the complete explosion occurs with this initial explosion as a trigger (time on and after t3). In the present embodiment, when starting the engine, the fuel injection by the intake system injectors 22 is executed in advance. For this reason, the fuel injected into each intake port 20a reaches the corresponding combustion chamber 16 at earlier timing than in the first embodiment so that the period from the start of engine to the complete combustion is shortened. Therefore, according to the present embodiment, it becomes possible to cause the initial explosion and the complete explosion to occur promptly when starting the engine, and further favorable engine startability is ensured.

The present embodiment has the following advantages.

(1) when starting the engine, both the fuel injection by the in-cylinder injectors 17 and the fuel injection by the intake system injectors 22 are executed, and after timing at which the fuel injected from the intake system injectors 22 reaches the combustion chambers 16, the fuel injection by the in-cylinder injectors 17 is stopped. For this reason, the initial explosion occurs promptly when starting the engine Thereafter, when the fuel injected into the intake ports 20a reaches the combustion chambers 16, whereby the complete explosion occurs with the initial explosion as a trigger In this case, in the above-described embodiment, when starting the engine, the fuel injection by the intake system injectors 22 is executed in advance. For this reason, the fuel injected into the intake ports 20a reaches the combustion chambers 16 at earlier timing as compared with the first embodiment so that a period from the start of engine to the complete combustion is shortened. Therefore, it becomes possible to cause the initial explosion and the complete explosion to occur promptly when starting the engine, and further favorable engine startability is ensured.

(2) After timing at which the fuel injected from the intake system injectors 22 reaches the combustion chambers 16, the fuel injection by the in-cylinder injectors 17 is stopped. For this reason, when starting the engine, occurrence of a malfunction in which the fuel directly injected into the combustion chambers 16 by the in-cylinder injectors 17 adheres to the inner wall of the combustion chambers 16 or the pistons 13 can be restrained as much as possible. Also, even when the fuel directly injected into the combustion chambers 16 adheres to the inner wall of the combustion chambers 16 or the pistons 13, the adhered fuel is reliably vaporized by such complete explosion as described above, and is burned together with the fuel injected into the intake ports 20a. In this case, in the above-described embodiment, the fuel injection by the intake system injectors 22 is executed in advance in the engine starting state. For this reason, the fuel injected into the intake ports 20a reaches the combustion chambers 16 at early timing after the start of engine, and the fuel injection of the in-cylinder injectors 17 is also stopped at early timing after the start of engine. Therefore, even when the fuel injection by the in-cylinder injectors 17 is executed when starting the engine in the internal combustion engine 11 having a plurality of cylinders, the in-cylinder injection is stopped before the in-cylinder injections into all the cylinders are completed. Therefore, it becomes possible to more reliably restrain the discharge of unburned component in the engine starting state while ensuring favorable engine startability.

(3) The timing at which the fuel injected from the intake system injectors 22 reaches the combustion chambers 16 varies with flow velocity of the intake air and a vaporized state of the fuel. Therefore, the timing can be computed on the basis of the engine operating state such as the engine speed NE, the intake passage pressure Pin, which relate to the flow velocity of the intake air, the intake air temperature THA, the coolant temperature THW, and the fuel pressure P, which relate to the vaporized state of the fuel. Thus, in the above-described embodiment, the timing at which the fuel injected from the intake system injectors 22 reaches the combustion chambers 16 is computed on the basis of the engine operating state, whereby the timing can be reliably computed. Thereby, it becomes possible to reliably stop the fuel injection by the in-cylinder injectors 17.

The above embodiments may be modified as follows.

In the first embodiment, when starting the engine, fuel injection by the in-cylinder injectors 17 is executed only for initial fuel injection in each cylinder of the internal combustion engine 11. On the other hand, when starting the engine, fuel injection by the in-cylinder injector 17 provided correspondingly to each cylinder, that is, in-cylinder injection is executed. In-cylinder injector 17, a number of times of consecutive fuel injections from each in-cylinder injector 17 may be measured, and when this number of times reaches a predetermined value (for example, twice), the fuel injection by the in-cylinder injector 17 may be changed over to the fuel injection by the corresponding intake system injector 22. This configuration also provides the same advantages as the first embodiment.

In the second embodiment, the timing at which the fuel injected from the intake system injectors 22 reaches the combustion chambers 16 is computed on the basis of the engine speed NE, the intake passage pressure Pin, the intake air temperature THA, the coolant temperature THW, and the fuel pressure P. As the intake air flow rate Qa increases, the flow velocity thereof becomes faster, and the timing becomes earlier timing than the timing at which the fuel injected from the intake system injectors 22 reaches the combustion chambers 16. The intake air flow rate Qa may be added to each of those parameters. Also, the timing may be computed through the use of at least any of those parameters. On the other hand, with the time when a first fuel injection from the intake system injectors 22 is executed as a starting point, the timing may be measured on the basis of an elapsed time from the starting point.

The present invention may be applied to an internal combustion engine in which, as a mode of fuel injection, only the port injection and the in-cylinder injection are executed Also, the present invention may be applied to an internal combustion engine in which stratified charge combustion using the in-cylinder injectors 17 is executed.

As described above, the in-cylinder injection ratio Rd and the port injection ratio Rp are changed such that their sum becomes 1. In other words, there is a negative correlation between the in-cylinder injection ratio Rd and the port injection ratio Rp. Therefore, in each of the embodiments and its modifications, each numerical value that is set on the basis of the in-cylinder injection ratio Rd may be set on the basis of the port injection ratio Rp. Conversely, each numerical value that is set on the basis of the port injection ratio Rp may be also set on the basis of the in-cylinder injection ratio Rd.

The fuel injection amount of the in-cylinder injectors 17 and the intake system injectors 22 does not need to be determined on the basis of the injection ratio such as the in-cylinder injection ratio Rd and the port injection ratio Rp, but may be directly set on the basis of the engine operating state.

Although in each of the above-described embodiments, the intake air flow rate Qa is computed on the basis of the intake passage pressure Pin, the amount of intake air may be detected through the use of an air flowmeter.

Although the intake system injectors 22 are provided in the intake ports 22a, respectively, the intake system injectors 22 may be replaced by an injector mounted on a surge tank which is provided, for example, in the path of the intake passage 20. Alternatively, the intake system injectors 22 may be replaced by a "cold start injector" for injecting fuel into the intake passage 20 only in the engine starting state. In short, the intake system injectors 22 may be replaced any type of injector that injects fuel into the intake system of the internal combustion engine.

Although the internal combustion engine 11 is a four-cylinder internal combustion engine, the present invention may be applied to an internal combustion engine having other numbers of cylinders than this on the basis of the similar principle.

Therefore, the present examples and embodiments are to be considered as illustrative and not restrictive and the invention is not to be limited to the details given herein, but may be modified within the scope and equivalence of the appended claims.

The invention claimed is:

1. An apparatus for controlling fuel injection of an internal combustion engine in a starting state, the engine including an in-cylinder injector for injecting fuel into a combustion chamber of the engine and an intake system injector for injecting fuel into an intake system connected to the combustion chamber, the apparatus comprising:
a control section that controls the in-cylinder injector and the intake system injector, wherein, in the starting state of the engine, the control section causes the in-cylinder injector to first inject fuel, and then switches from the fuel injection through the in-cylinder injector to fuel injection through the intake system injector.

2. The apparatus according to claim 1, wherein, in the starting state of the engine, the control section causes the in-cylinder injector to perform only the initial injection to the combustion chamber, and causes the intake system injector to perform fuel injections after the initial injection.

3. The apparatus according to claim 1, wherein the control section measures the number of times of consecutive fuel injections from the in-cylinder injector, and when the number of times reaches a predetermined value, the control section switches to the fuel injection through the intake system injector.

4. An apparatus for controlling fuel injection of an internal combustion engine in a starting state, the engine including an in-cylinder injector for injecting fuel into a combustion chamber of the engine and an intake system injector for injecting fuel into an intake system connected to the combustion chamber, the apparatus comprising:
a control section that controls the in-cylinder injector and the intake system injector, wherein, in the starting state of the engine, the control section causes the in-cylinder injector and the intake system injector to inject fuel, and, after timing at which fuel injected from the intake system injector reaches the combustion chamber, the control section causes the in-cylinder injector to stop injecting fuel.

5. The apparatus according to claim 4, wherein the control section determines the timing at which fuel injected from the intake system injector reaches the combustion chamber based on an operating state of the engine.

6. The apparatus according to claim 4, wherein the combustion chamber is one of a plurality of combustion chambers, the in-cylinder injector is one of a plurality of in-cylinder injectors each corresponding to one of the combustion chambers, and the intake system injector is one of a plurality of intake system injectors each corresponding to one of the combustion chambers, and wherein, after fuel injected from one of the intake system injectors that has first injected fuel among the intake system injectors reaches the corresponding combustion chamber, the control section causes all the in-cylinder injectors to stop injecting fuel.

7. A method for controlling fuel injection of an internal combustion engine in a starting state, the engine including an in-cylinder injector for injecting fuel into a combustion chamber of the engine and an intake system injector for injecting fuel into an intake system connected to the combustion chamber, the method comprising:
causing the in-cylinder injector to first inject fuel in the starting state of the engine; and
then switching from the fuel injection through the in-cylinder injector to fuel injection through the intake system cylinder.

8. The method according to claim 7, wherein the in-cylinder injector performs only the initial injection to the combustion chamber in the starting state of the engine.

9. A method for controlling fuel injection of an internal combustion engine in a starting state, the engine including an in-cylinder injector for injecting fuel into a combustion chamber of the engine and an intake system injector for injecting fuel into an intake system connected to the combustion chamber, the method comprising:
causing the in-cylinder injector and the intake system injector to inject fuel in the starting state of the engine; and
causing the in-cylinder injector to stop injecting fuel after timing at which fuel injected from the intake system injector reaches the combustion chamber.

* * * * *